United States Patent
Irwan et al.

(10) Patent No.: US 10,581,605 B2
(45) Date of Patent: *Mar. 3, 2020

(54) DECENTRALIZED INFORMATION PROTECTION FOR CONFIDENTIALITY AND TAMPER-PROOFING ON DISTRIBUTED DATABASE

(71) Applicant: Xage Security, Inc., Palo Alto, CA (US)

(72) Inventors: Susanto Junaidi Irwan, San Francisco, CA (US); Roman M. Arutyunov, San Jose, CA (US); Alexander Michael Valderrama, Palo Alto, CA (US)

(73) Assignee: Xage Security, Inc., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/133,323

(22) Filed: Sep. 17, 2018

(65) Prior Publication Data

US 2019/0319792 A1    Oct. 17, 2019

Related U.S. Application Data

(63) Continuation of application No. 15/954,365, filed on Apr. 16, 2018, now Pat. No. 10,084,600.

(51) Int. Cl.
*H04L 29/06* (2006.01)
*H04L 9/30* (2006.01)
(Continued)

(52) U.S. Cl.
CPC .......... *H04L 9/3093* (2013.01); *H04L 9/0637* (2013.01); *H04L 9/085* (2013.01);
(Continued)

(58) Field of Classification Search
None
See application file for complete search history.

(56) References Cited

U.S. PATENT DOCUMENTS 7,263,191 B2    8/2007 Chen
7,490,065 B1    2/2009 Ogg
(Continued)

OTHER PUBLICATIONS

The International Searching Authority, "Search Report" in application No. PCT/US19/27768, dated Jul. 5, 2019, 15 pages. Current Claims in application No. PCT/US19/27768, dated Jul. 2019, 7 pages.

*Primary Examiner* — Malcolm Cribbs
(74) *Attorney, Agent, or Firm* — Hickman Palermo Becker Bingham LLP; Tina T. Wang

(57) ABSTRACT

In an embodiment, a computer-implemented data security method comprises: using a first computing device, generating a plurality of encrypted shares from a plurality of shares of hidden security service data by using a separate public key from a plurality of public keys that correspond to a plurality of second computing devices; using a requesting second computing device, accessing and decrypting a first encrypted share of the plurality of encrypted shares using a first private key corresponding to the requesting second computing device to generate a first portion of the hidden security service data; using an available second computing device, decrypting a second encrypted share of the plurality of encrypted shares using a second private key corresponding to the available second computing device to generate a decrypted share; using the available second computing device, re-encrypting the decrypted share using a public key corresponding to the requesting second computing device to generate a re-encrypted share and sending the re-encrypted share to the requesting second computing device; and using the requesting second computing device, decrypting the
(Continued)

re-encrypted share using the first private key to generate a second portion of the hidden security service data; using the first portion and second portion of the hidden security service data, forming and using a readable copy of the hidden security service data to perform authentications.

20 Claims, 9 Drawing Sheets

(51) Int. Cl.
  *H04L 9/08* (2006.01)
  *H04L 9/32* (2006.01)
  *H04L 9/14* (2006.01)
  *H04L 9/06* (2006.01)
(52) U.S. Cl.
  CPC .............. *H04L 9/0861* (2013.01); *H04L 9/14* (2013.01); *H04L 9/321* (2013.01)

(56) References Cited

U.S. PATENT DOCUMENTS

| | | |
|---|---|---|
| 8,050,409 B2 | 11/2011 | Agrawal |
| 8,259,947 B2 | 9/2012 | Rose |
| 9,774,578 B1 | 9/2017 | Ateniese |
| 2002/0178354 A1 | 11/2002 | Ogg |
| 2003/0091192 A1 | 5/2003 | Chen et al. |
| 2007/0253548 A1* | 11/2007 | Kameyama ......... G06F 21/6218 380/28 |
| 2009/0316897 A1* | 12/2009 | Kambayashi ......... H04L 9/0897 380/255 |
| 2010/0131755 A1 | 5/2010 | Zhu |
| 2010/0153703 A1 | 6/2010 | Dodgson |
| 2010/0217986 A1 | 8/2010 | Schneider |
| 2012/0072723 A1 | 3/2012 | Orsini |
| 2013/0091351 A1* | 4/2013 | Manges .................... H04L 9/14 713/153 |
| 2013/0191632 A1 | 7/2013 | Spector |
| 2014/0129844 A1 | 5/2014 | Johnson |
| 2014/0229731 A1 | 8/2014 | O'Hare |
| 2016/0094540 A1 | 3/2016 | Camenisch |
| 2016/0132684 A1* | 5/2016 | Barbas .................. G06F 21/602 713/165 |
| 2016/0344708 A1 | 11/2016 | Kawai |
| 2017/0093564 A1 | 3/2017 | Bernat |
| 2017/0243193 A1 | 8/2017 | Manian |
| 2018/0004930 A1 | 1/2018 | Csinger |
| 2018/0121636 A1 | 5/2018 | Schiffman |

* cited by examiner

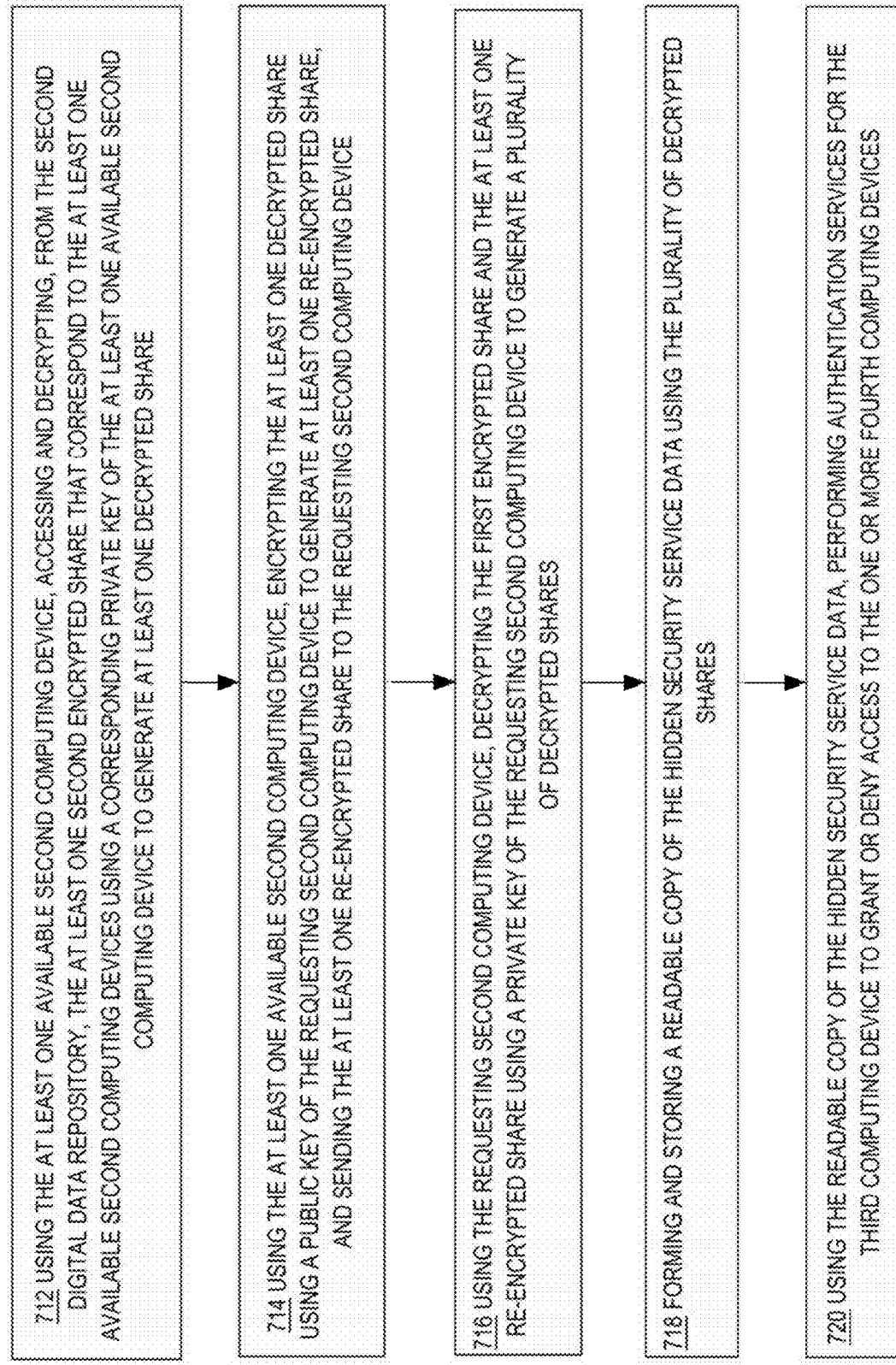

U.S. 10,581,605 B2

DECENTRALIZED INFORMATION PROTECTION FOR CONFIDENTIALITY AND TAMPER-PROOFING ON DISTRIBUTED DATABASE

BENEFIT CLAIM

This application claims the benefit under 35 U.S.C. § 120 as a Continuation of application Ser. No. 15/954,365, filed Apr. 16, 2018, the entire contents of which is hereby incorporated by reference for all purposes as if fully set forth herein.

TECHNICAL FIELD

The technical field of the present disclosure relates to improved methods, systems, computer software, and/or computer hardware in the field of data security. The disclosure relates more specifically to improved computer-implemented methods and systems for providing decentralized data security through a distributed architecture using a distributed database. Certain embodiments are useful in providing validation and access control services for internet of things (IoT) devices and improving the resistance of networked IoT devices to attacks, unauthorized or malicious use, or malware.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The development and deployment of internet of things (IoT) devices has proceeded with remarkable speed in the past several years. IoT devices are diverse, including everything from controllers of industrial equipment to smart watches and personal activity monitors. However, security infrastructure has not kept pace with the huge number and wide use of these devices. Some analysts estimate that billions of such devices will be operating and connected to internetworks within a few years, but there is presently no effective security architecture that can efficiently permit IoT devices to be secured, yet readily usable. Key constraints in this technical field have included limited processing power, limited memory, limited or absent user interface elements, and limited and intermittent network connectivity. All these characteristics of IoT devices make them difficult to integrate into existing client-server security systems. At the same time, misuse of IoT devices could be catastrophic by permitting an attacker or unauthorized user to gain control of industrial equipment or other systems that have embedded IoT devices.

Traditionally, client computing devices with internet access can connect to enterprise server computers, which provide identity and access management (IAM) services for managing, validating, and controlling user access. Almost without exception, networks that permit access from desktop computers or mobile computing devices of end users have placed all principal security apparatus at the server computer. For example, a user who wants access to an online account can use a computer with internet connectivity to access a website with a login page and input identity information, such as a username and password. Once a server computer validates the identity information, policies control the amount of access any particular device has so that the user can access their own online account without accessing any other data. With this traditional approach, a security breach of the enterprise server could compromise the identity information of all the users.

Thus, there is a need for increased data security through the use of a distributed architecture. There is also a need for a secure method of storing and accessing identity information or any security service information that is tolerant of security breaches.

SUMMARY

The appended claims may serve as a summary of the invention.

BRIEF DESCRIPTION OF THE DRAWINGS

The present invention is illustrated by way of example, and not by way of limitation, in the figures of the accompanying drawings and in which like reference numerals refer to similar elements and in which:

FIG. 7B illustrates a method or algorithm for improving data security through a distributed architecture, in an example embodiment.

DETAILED DESCRIPTION

Figure 1:
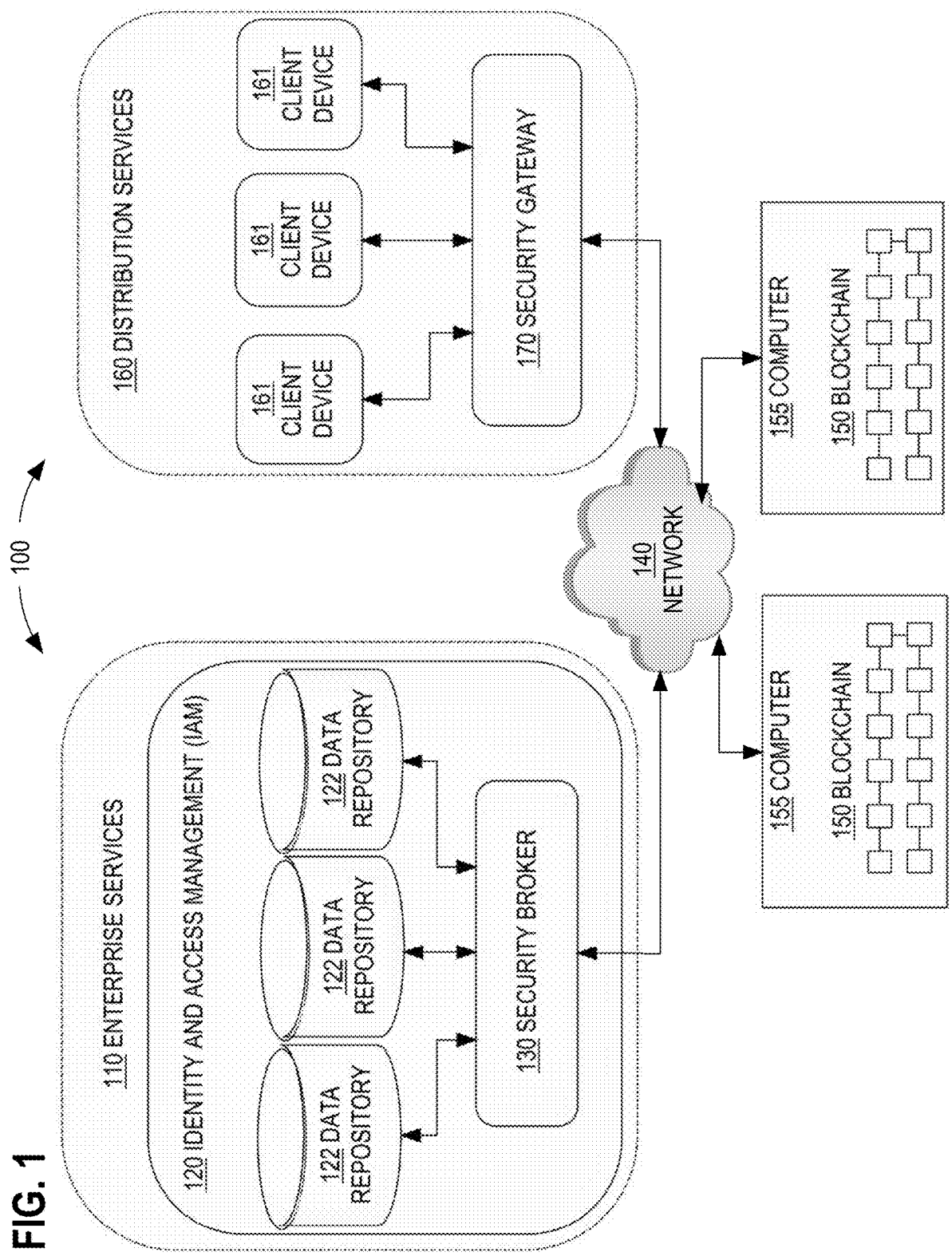
FIG. 1 illustrates a networked computer system, in an example embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein in sections according to the following outline:

1.0 GENERAL OVERVIEW
2.0 STRUCTURAL OVERVIEW
  2.1 ENTERPRISE SERVICES
  2.2 BLOCKCHAIN ARCHITECTURE
  2.3 DISTRIBUTION SERVICES
3.0 FUNCTIONAL OVERVIEW
  3.1 SECURITY BROKER
  3.2 BLOCKCHAIN OPERATIONS
  3.3 SECURITY GATEWAY 4.0 PROCEDURAL OVERVIEW
5.0 HARDWARE OVERVIEW 1.0 General Overview According to various embodiments, methods and systems are provided that enable improved computer and network efficiency and data security. Specifically, the present approach decentralizes IAM data, localizes IAM services, utilizes a consensus network for data security, and utilizes a distributed encryption and decryption to hide the IAM data, all of which has the benefit of decreasing network traffic and excessive use of processing resources for enterprise servers while increasing resistance against malicious attacks on sensitive data. Moreover, IAM services can be effectively extended from an enterprise computing environment to a plurality of internet of things (IoT) devices that are geographically distributed and separate from the enterprise environment, without implementing resource-intensive security software on or at each IoT device.

In an embodiment, a networked computer system comprises a security broker for enterprise services, a security gateway for distribution services, and a blockchain system to store and transfer security service data, such as identity information, between the security broker and the security gateway. The security broker may be software, hardware, or a combination thereof that detects changes to the security service data, encrypts and distributes the data in shares, and updates blockchain data with the distributed encrypted shares. The security gateway may be software, hardware, or a combination thereof that detects changes to the blockchain data and updates a local data repository with the security service data. The security gateway also provides local, virtual IAM services using the security service data stored in the local data repository. The blockchain system is a distributed database storing linked blocks of data in multiple computing devices.

In an embodiment, a computer-implemented data security method comprises, at a first computing device, receiving security service data from a first digital data repository. The method further comprises using the first computing device, generating hidden security service data by generating a plurality of shares of the security service data. The method further comprises, using the first computing device, encrypting each share of the plurality of shares using a separate public key from among a plurality of public keys corresponding to each of a plurality of second computing devices, to generate a plurality of encrypted shares. The method further comprises electronically storing the plurality of encrypted shares as data in a second digital data repository. The method further comprises, using a subset of the plurality of second computing devices, in response to receiving an authentication request from a third computing device to access one or more fourth computing devices, decrypting a subset of the plurality of encrypted shares using a subset of separate private keys corresponding to each of the subset of the plurality of second computing devices to generate a plurality of decrypted shares. The method further comprises forming and storing a readable copy of the hidden security service data using the plurality of decrypted shares and, using the readable copy of the hidden security service data, performing authentication services for the third computing device to grant or deny access to the one or more fourth computing devices.

In an embodiment, a computer system provides an improvement in data security. The system comprises a distributed blockchain data repository, a first computing device, and at least two second computing devices of a plurality of second computing devices. The first computing device is communicatively coupled to the distributed blockchain data repository and comprises a first non-transitory data storage medium storing instructions which, when executed by the first computing device, cause: at a first computing device, receiving security service data from a first digital data repository; using the first computing device, generating hidden security service data by generating a plurality of shares of the security service data; using the first computing device, encrypting each share of the plurality of shares using a separate public key from among a plurality of public keys corresponding to each of a plurality of second computing devices, to generate a plurality of encrypted shares; electronically storing the plurality of encrypted shares as data in a second digital data repository; using a subset of the plurality of second computing devices, in response to receiving an authentication request from a third computing device to access one or more fourth computing devices, decrypting a subset of the plurality of encrypted shares using a subset of separate private keys corresponding to each of the subset of the plurality of second computing devices to generate a plurality of decrypted shares; forming and storing a readable copy of the hidden security service data using the plurality of decrypted shares; using the readable copy of the hidden security service data, performing authentication services for the third computing device to grant or deny access to the one or more fourth computing devices.

In an embodiment, a computer-implemented data security method comprises, at a first computing device, receiving security service data for accessing one or more Internet of Things (IoT) computing devices from a first digital data repository. The method further comprises, using the first computing device, generating, on behalf of an enterprise server and using the security service data, a stored digital representation of a polynomial function and calculating a plurality of x-y coordinate points from the polynomial function to generate a plurality of shares of the security service data, each share of the plurality of shares representing a point of the plurality of x-y coordinate points. The method further comprises, using the first computing device, encrypting each share of the plurality of shares using a separate public key from among a plurality of public keys corresponding to each of a plurality of second computing devices, to generate a plurality of encrypted shares. The method further comprises, using the first computing device, electronically updating a distributed blockchain data repository with the plurality of encrypted shares. The method further comprises, using a requesting second computing device of the plurality of second computing devices, receiving an authentication request from a third computing device to access the one or more IoT computing devices and, in response to receiving the authentication request, requesting a first encrypted share of the plurality of encrypted shares, encrypted using a first public key corresponding to the requesting second computing device, from the distributed blockchain data repository, and requesting at least one second encrypted share of the plurality of encrypted shares from at least one available second computing device of the plurality of second computing devices. The method further comprises, using the at least one available second computing device, accessing and decrypting, from the distributed blockchain data repository, the at least one second encrypted share that correspond to the at least one available second computing device using a corresponding private key of the at least one available second computing device to generate at least one decrypted share. The method further comprises, using the at least one available second computing device, encrypting the at least one decrypted share using a public key of the requesting second computing device to generate at least one re-encrypted share, and sending the at least one re-encrypted share to the requesting second computing device. The method further comprises, using the requesting second computing device, decrypting the first encrypted share and the at least one re-encrypted share using a private key of the requesting second computing device to form at least two points of the plurality of x-y coordinate points. The method further comprises, using the requesting second computing device, reconstructing the stored digital representation of the polynomial function using the at least two points of the plurality of x-y coordinate points to form the security service data. The method further comprises, using the requesting second computing device, in response to forming the security service data, performing authentication services using the readable copy of the hidden security service data for the third computing device to grant or deny access to the one or more IoT computing devices.

2.0 Structural Overview

FIG. 1 illustrates a networked computer system in an example embodiment. In an embodiment, a computer system 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments. A "computer" may be one or more physical computers, virtual computers, and/or computing devices. As an example, a computer may be one or more server computers, cloud-based computers, cloud-based cluster of computers, docker containers, virtual machine instances or virtual machine computing elements such as virtual processors, storage and memory, data centers, storage devices, desktop computers, laptop computers, mobile devices, and/or any other special-purpose computing devices. Any reference to "a computer" herein may mean one or more computers, unless expressly stated otherwise. The instructions identified above are executable instructions and may comprise one or more executable files or programs that have been compiled or otherwise built based upon source code prepared in JAVA, C++, OBJECTIVE-C or any other suitable programming environment.

FIG. 1 illustrates only one of many possible arrangements of components configured to execute the programming described herein. Other arrangements may include fewer or different components, and the division of work between the components may vary depending on the arrangement. In the example of FIG. 1, a networked computer system 100 may facilitate the secure exchange of data between programmed computing devices providing enterprise services 110, devices providing distribution services 160, and devices of a blockchain 150. Therefore, each of elements 110, 150, 160 of FIG. 1 may represent one or more computers that host or execute stored programs that provide the functions and operations that are described further herein in connection with enterprise services, distribution services and blockchain operations. The methods and systems describe herein may be designed to accommodate a variety of different enterprises. Each enterprise may have its own security broker 130, blockchain 150, and/or security gateway 170 with settings that are customized to the preferences of each enterprise.

2.1 Enterprise Services

Enterprise services 110 may be services that are programmatically offered by an enterprise, including identity and access management (IAM) 120 services. Typically, such services are delivered by executing control programs or application programs on computers and processing and responding to requests of client computing devices using client-server digital message communications over networks based on defined protocols. IAM 120 services may enable devices, such as enterprise servers, to manage, validate, and control device and user access for any of a plurality of geographically distributed computing devices, including but not limited to IoT devices.

Enterprise servers and other enterprise computing devices are often heavily protected to ensure data security and prevent malware breaches. Traditionally, when a device requests access from an enterprise server, the enterprise server may go through a validation process that is managed using programs executed in cooperation by the enterprise server and device. The validation process may include authentication, authorization, and accounting of users, applications, and/or devices. Access control policies defined by the enterprise server may determine which users, applications, and/or devices will have access to what types of data. Instead of this traditional approach, one embodiment of the current approach implements a validation process not at the enterprise server but using a security gateway 170, as further described herein, with significant technical benefits and improvements over past practice.

In an embodiment, the access control policies may be stored in a data repository 122 associated with the enterprise server and updated according to enterprise needs. Consequently, a central control point associated with an enterprise can maintain control of security policy, while IAM 120 services or other functions are executed closer to protected IoT devices, for example. Identity information associated with users, applications, and/or devices may also be stored in data repository 122. Identity information may include, for example, usernames, passwords, and their corresponding access control policies. Identity information may also be referred to as security service data herein. In an embodiment, security service data may be usernames and passwords, keys, tokens, certificates, audit logs, or any other security service data.

Security broker 130 may be a computer, software and/or hardware or a combination storing instructions that are programmed or configured to access identity information stored in the data repository 122 and detect changes to the identity information. The security broker 130 may generate secret shares of the identity information, hash and encrypt the identity information, and send the information over a network 140 to a blockchain 150, as further described herein.

Network 140 broadly represents a combination of one or more local area networks (LANs), wide area networks (WANs), metropolitan area networks (MANs), global interconnected internetworks, such as the public internet, or a combination thereof. Each such network may use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein may be configured to connect to the network 140 and the disclosure presumes that all elements of FIG. 1 are communicatively coupled via network 140. The various elements depicted in FIG. 1 may also communicate with each other via direct communications links that are not depicted in FIG. 1 for purposes of explanation.

While each of the components listed above is illustrated as if located on a single computer, one or more of the components listed above may be part of and/or executed on different computers. For example, data repository 122 may be located on the same or a separate computer from another data repository 122. As another example, data repository 122 may be storage drives coupled to an enterprise server.

2.2 Blockchain Architecture

The blockchain 150 may comprise blocks of linked data that are stored in an interconnected network of computers, with suitable stored programs at those computers to support ordered creation and transmission of blockchain data. Blockchain 150 forms a distributed database that maintains a continuously growing list of ordered records termed blocks that are timestamped and linked to a previous block. Each block in the series of blocks is linked together chronologically, with each new block containing a hash of the previous block. Each computer 155, or node, in a network of computers may store the entire record of linked data blocks. This creates a consensus network of computers that can verify the integrity of each block of data and the integrity of the entire blockchain 150. The consensus network has the benefit of having a high Byzantine fault tolerance, which is the ability of a computing system to tolerate Byzantine failures. As a result, the blockchain 150 functions as a distributed database that ensures the integrity of the data by utilizing hash functions to link each block to its previous block and storing the entire record of data blocks at each node.

2.3 Distribution Services

Distribution services 160 may be computer-implemented services that are configured or programmed for distributing IAM services locally to a client device 161. A client device 161 may be a computer, a virtual computer, and/or a computing device. As an example, a computer may be one or more server computers, cloud-based computers, cloud-based cluster of computers, docker containers, virtual machine instances or virtual machine computing elements such as virtual processors, storage and memory, data centers, storage devices, desktop computers, laptop computers, mobile devices, and/or any other special-purpose computing devices. The client device 161 may also be other IoT devices, which are physical devices with network connectivity capabilities that enables these physical devices to collect and exchange data. The client device 161 may also be specific users using a computer or IoT device. The client device 161 may also be applications running on a computer or IoT device.

Security gateway(s) 170 may be a computer, software and/or hardware or a combination storing instructions configured to work in conjunction with other security gateways 170 to access identity information stored in the blockchain 150, encrypt and/or decrypt secret shares, and perform virtual IAM services locally. Client device 161 may connect to the security gateway 170 so that the security gateway 170 may perform virtual IAM services for client device 161 using the identity information stored in a blockchain 150. Once authenticated, client device 161 may access one or more other devices, such as an IoT camera, and/or data from those devices, such as video feed from the IoT camera.

3.0 Functional Overview

In an embodiment, the security broker 130, blockchain 150, and security gateway 170 interoperate programmatically in unconventional manner to provide a virtual security intermediary between the enterprise services 110 and the client device 161. In an embodiment, security gateway 170 is programmed to provide local, virtual IAM services with or without the need for client device 161 to connect to the internet and access enterprise servers that would otherwise perform these IAM 120 services. The security broker 130 and blockchain 150 are programmed or configured to copy, encrypt, distribute, store, and transport sensitive identity information in a secure manner so that the security gateway 170 may be updated with changes to the identity information, as further described in other sections herein.

3.1 Security Broker

Figure 2:
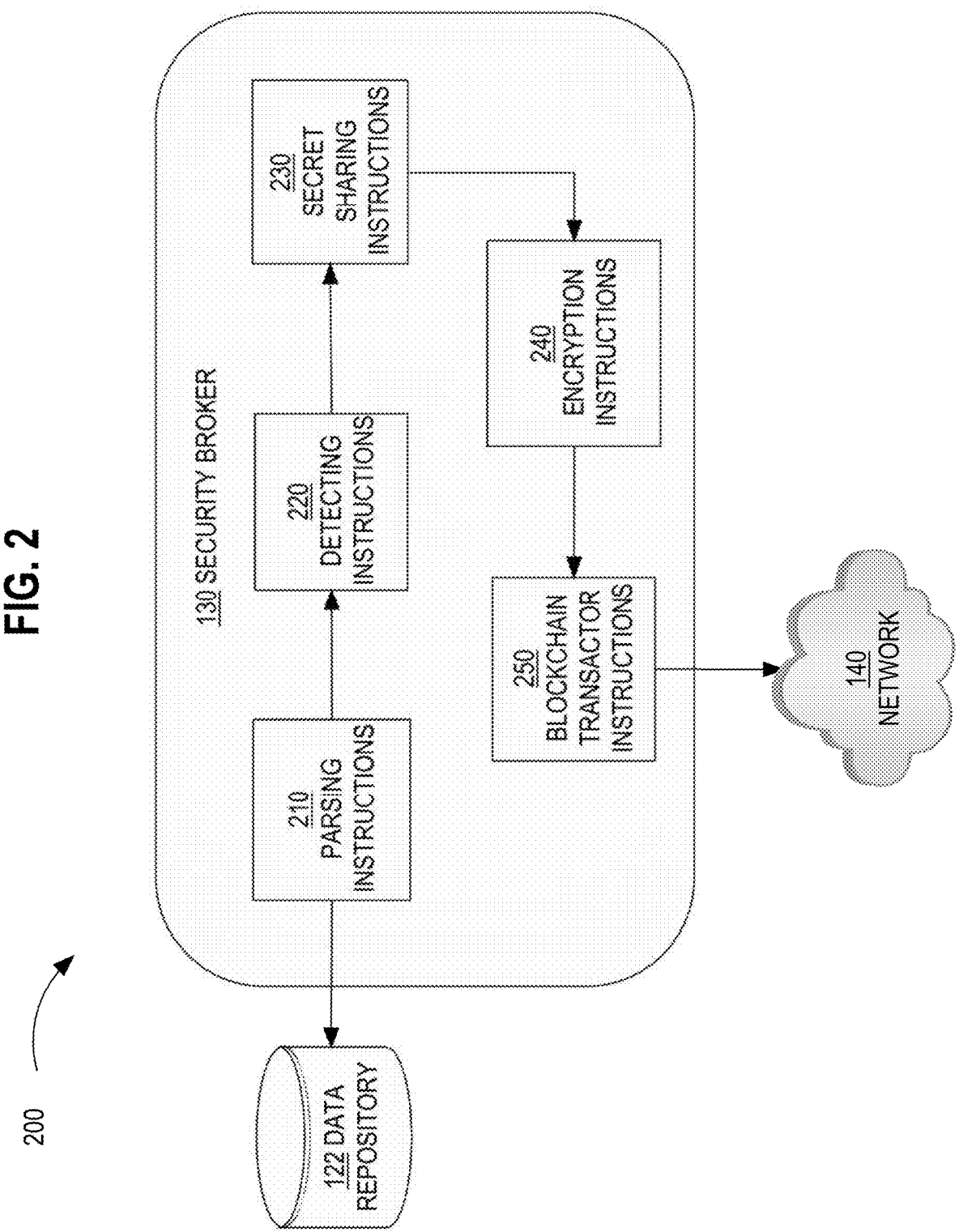
FIG. 2 illustrates a security broker, in an example embodiment.

FIG. 2 illustrates a security broker in an example embodiment.

In an embodiment, reference numeral 200 indicates a computer system comprising a security broker 130 and data repository 122 coupled to a data network 140. Security broker 130 may be a computer, software and/or hardware or a combination storing instructions and/or databases that act to protect, store, distribute, encrypt, and transfer security service information associated with one or more enterprise servers. Specifically, security broker 130 may contain parsing instructions 210 which access the security service information stored in data repository 122 and parse the identity information to generate a reorganized list of security service information. The reorganized list may be a list of cleartext usernames and passwords, keys, tokens, certificates, audit logs, or any other security service data, or it may be hashes of the usernames and passwords, keys, tokens, certificates, audit logs, or any other security service data that were generated by the enterprise servers. The list of cleartext usernames and passwords or any other security service data, or the hashes of the usernames and passwords or any other security service data, are generated for organizational purposes. For example, the security service information used by the enterprise servers for IAM 120 services may have a particular hierarchical structure. The information processing instructions 230 may create its own representation of the security service information to interpret the hierarchical structure. The frequency at which the security broker 130 accesses and parses the security service information may be determined by the enterprise. The frequency may be in seconds, minutes, hours, days, weeks, or any other increment of time. The frequency may also be based on Internet connectivity availability, demand, or any other factor.

The security broker 130 is programmed to detect changes to the security service information since the previous check. Specifically, the security broker 130 may contain detecting instructions 220 which compare the current hash with a hash from a previous detection. When security service information such as usernames and passwords or any other security data is stored, a hash function may be applied to the security service information. For example, a hash function, such as an MD5, Secure Hash Algorithm (SHA), or any other hash function may map each username and password to a hash, or index, such as an MD5 hash, SHA hash, or any other hash value. The hash may act as a numerical representation of each username and password or other security service information. Any hash function, as understood in the art, may be used. Any changes to the security service information would change the hash, thereby creating differences in the current hash compared to the hash from a previous detection.

If the hash has not changed, then the security broker 130 is programmed to return to parsing. However, if the hash has changed, then the secret sharing instructions 230 may extract the security service information from the data repository 122 and hide the security service information. The secret sharing instructions 230 may generate numerous shares of the security service information. The number of shares may be equivalent to the number of security gateways 170, in an example embodiment. The shares may then be encrypted by encrypting instructions 240 to generate numerous encrypted shares, as further described herein.

Blockchain transactor instructions 250, associated with the security broker 130, may identify the newly encrypted shares and update blockchain 150 by creating new data entries of the encrypted shares in the blockchain 150. The encrypted security service information is sent to the blockchain 150 through the network 140.

Figure 3:
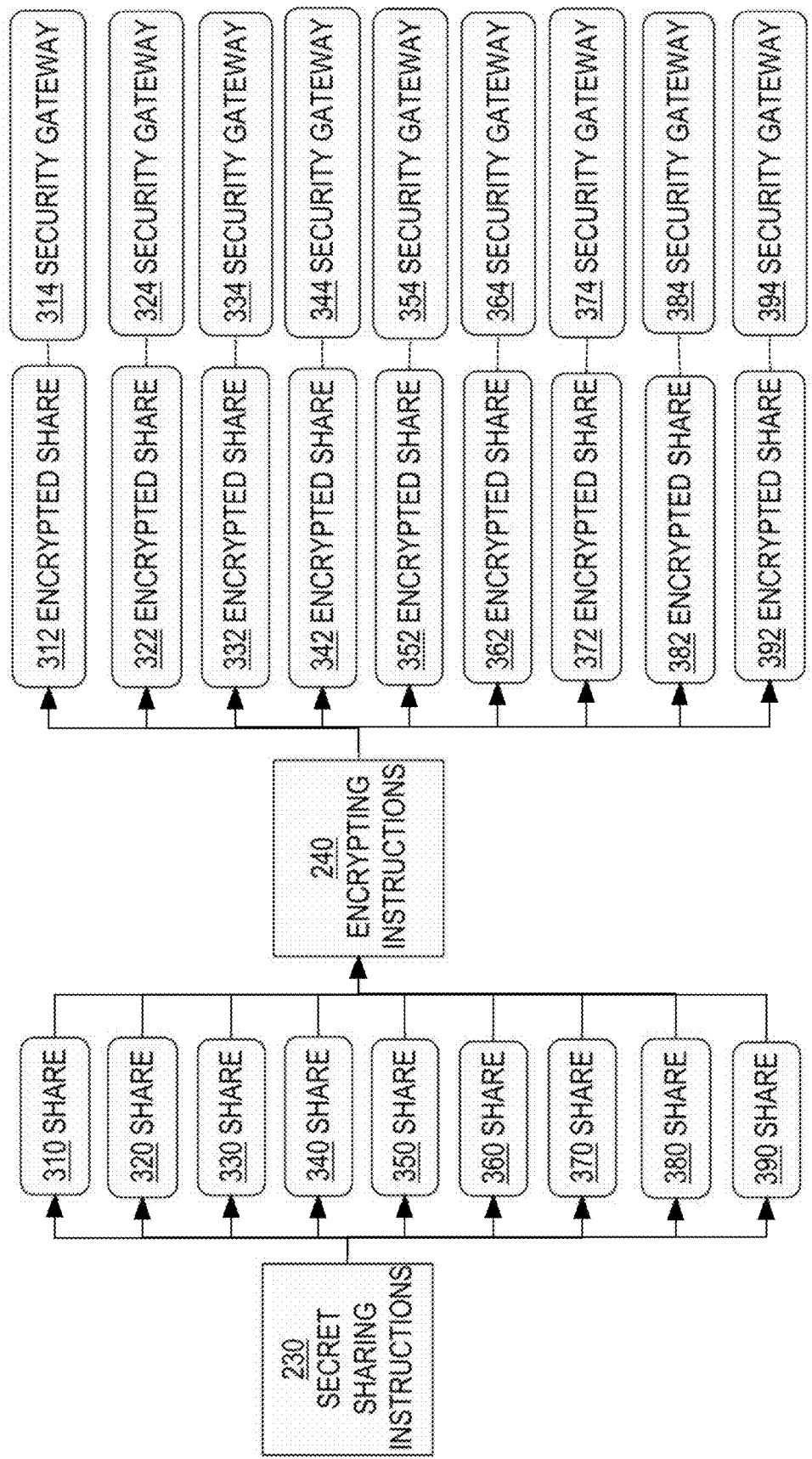
FIG. 3 illustrates a security broker data encryption and distribution workflow, in an example embodiment.

FIG. 3 illustrates a security broker data encryption and distribution workflow. In an example embodiment, workflow 300 involves secret sharing instructions 230 transformed to shares, and using encrypting instructions 240 to produce encrypted shares for transmission to security gateways.

Secret sharing instructions 230 may implement any secret sharing algorithm to hide the identity information. In the example of FIG. 3, secret sharing instructions 230 may hide the identity information by dividing the identity information into nine parts, or share(s) 310, 320, 330, 340, 350, 360, 370, 380, 390, where any two shares would be sufficient to reconstruct the hidden identity information. While nine shares are used in this embodiment, six shares, eight shares, ten shares, or any other number of shares may be used. In an embodiment, the number of shares may be equal to the number of security gateways 170 such that each share may be encrypted by a public key corresponding to each gateway, and thus may be decrypted by a corresponding private key of each gateway.

Specifically, in an embodiment, secret sharing instructions 230 may generate a digital representation of a polynomial function using the identity information. For example, the security broker 130 may generate a digital representation of the function below using the identity information:

$$f(x)=a_0+a_1x+a_2x^2$$

where $a_0$ may be a numerical integer representing the identity information, $a_1$ may be a numerical integer coefficient representing a first randomly generated number, and $a_2$ may be a numerical integer coefficient representing a second randomly generated number. In an embodiment, if the security service information contains characters or a combination of characters and numeric values, then any cipher may be used to convert the identity information into a numeric value for $a_0$.

The secret sharing instructions 230 may then calculate a series of points $D_0, D_1, \ldots D_{x-1}$, along the polynomial function using finite field, or modular, arithmetic:

$$D_{x-1}=(x,f(x)(\bmod p))$$

where mod p represents a prime number that is larger than the number of shares and every $a_i$. $D_0$ represents a first x-y coordinate point, $D_1$ represents a second x-y coordinate point, $D_2$ represents a third x-y coordinate point, and so forth until all nine x-y coordinate points representing all nine shares are generated.

While integer arithmetic may be used, finite field arithmetic provides increased security against malware or bots that attempt to exploit the known order of the polynomial function. Moreover, while the above technique describes one method of secret sharing encryption, any secret sharing encryption technique may be used.

In the example of FIG. 3, once the secret sharing instructions 230 generates all nine shares 310, 320, 330, 340, 350, 360, 370, 380, 390, each share is encrypted with a separate public key that corresponds to each of nine security gateways. For example, encrypting instructions 240 may encrypt share 310 with a public key corresponding to security gateway 314 to generate encrypted share 312.

Share 320 may be encrypted with a public key corresponding to security gateway 324 to generate encrypted share 322. Share 330 may be encrypted with a public key corresponding to security gateway 334 to generate encrypted share 332. Share 340 may be encrypted with a public key corresponding to security gateway 344 to generate encrypted share 342. Share 350 may be encrypted with a public key corresponding to security gateway 354 to generate encrypted share 352. Share 360 may be encrypted with a public key corresponding to security gateway 364 to generate encrypted share 362.

Share 370 may be encrypted with a public key corresponding to security gateway 374 to generate encrypted share 372. Share 380 may be encrypted with a public key corresponding to security gateway 384 to generate encrypted share 382. Share 390 may be encrypted with a public key corresponding to security gateway 394 to generate encrypted share 392.

Subsequently, each security gateway 314, 324, 334, 344, 354, 364, 374, 384, 394 may use their own private key to decrypt a corresponding encrypted share 312, 322, 332, 342, 352, 362, 372, 382, 392, as further described herein.

Security broker 130 may subsequently execute blockchain transactor instructions 250 to store each of the encrypted shares as data in the distributed blockchain 150 database.

3.2 Blockchain Operations

In other applications, a blockchain functions as a decentralized digital ledger that tracks numerous entries. Copies of the entire blockchain may be stored at each computer 155, or node, in a distributed network of interconnected computers of which FIG. 1 illustrates computer 155 with blockchain 150.

In an embodiment, proposed entries to the blockchain 150 may be checked by a majority of the computers for verification. For example, if the blockchain transactor instructions 250 of the security broker 130 attempts to generate a new entry in the blockchain 150, the network of interconnected computers that also store copies of the blockchain would first run algorithms to evaluate the hashes and verify the validity of the entry. If a majority of the computers agree that the entry is valid, then the entry will be added as a new block in the blockchain 150. As a part of a consensus network, blockchain 150 enforces high Practical Byzantine Fault Tolerance (PBFT) and other types of consensus algorithms; for example, a malicious attack attempting to alter the information in the blockchain 150 would need to control over 50% of the computers in the consensus network to alter the consensus. Since it would be exceedingly difficult to maliciously attack and maintain control over that many computers, the blockchain data is better protected against malicious attacks than traditional methods of data storage.

Figure 4:
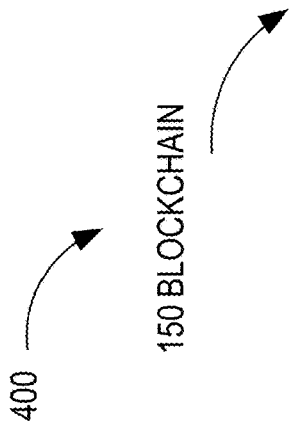
FIG. 4 illustrates a digital blockchain database, in an example embodiment.

FIG. 4 illustrates a digital blockchain database. In an example embodiment, a digital blockchain database 400 comprises a blockchain 150 having blocks 410, 420, 430. Blockchain 150 may include any number of blocks. In the example of FIG. 4, each block 410, 420, 430 may include its own index number 411, 421, 431, timestamp 412, 422, 432, data 413, 423, 433, hash 414, 424, 434, and previous hash 415, 425, 435.

The index number 411, 421, 431 may be a numerical index that indicates the block's placement in the chain. The timestamp 412, 422, 432 may be the date and time of when a block 410, 420, 430 is created. The data 413, 423, 433 may be an encrypted share stored as "block0data" "block1data", and "block2data" in the blocks 410, 420, 430, respectively. The hash 414, 424, 434 may be a hash of the encrypted share, such as an MD5 hash, SHA256 hash, or RIPEMD hash. The previous hash 415, 425, 435 may be the hash of the previous block, which links the blocks in sequence. In the example of FIG. 4, block 430 stores a record of previous hash 424, while block 420 stores a record of previous hash 414. These records of previous hashes link each new block to the previous block to form a chain that allows for integrity checks of each block.

3.3 Security Gateway

Figure 5:
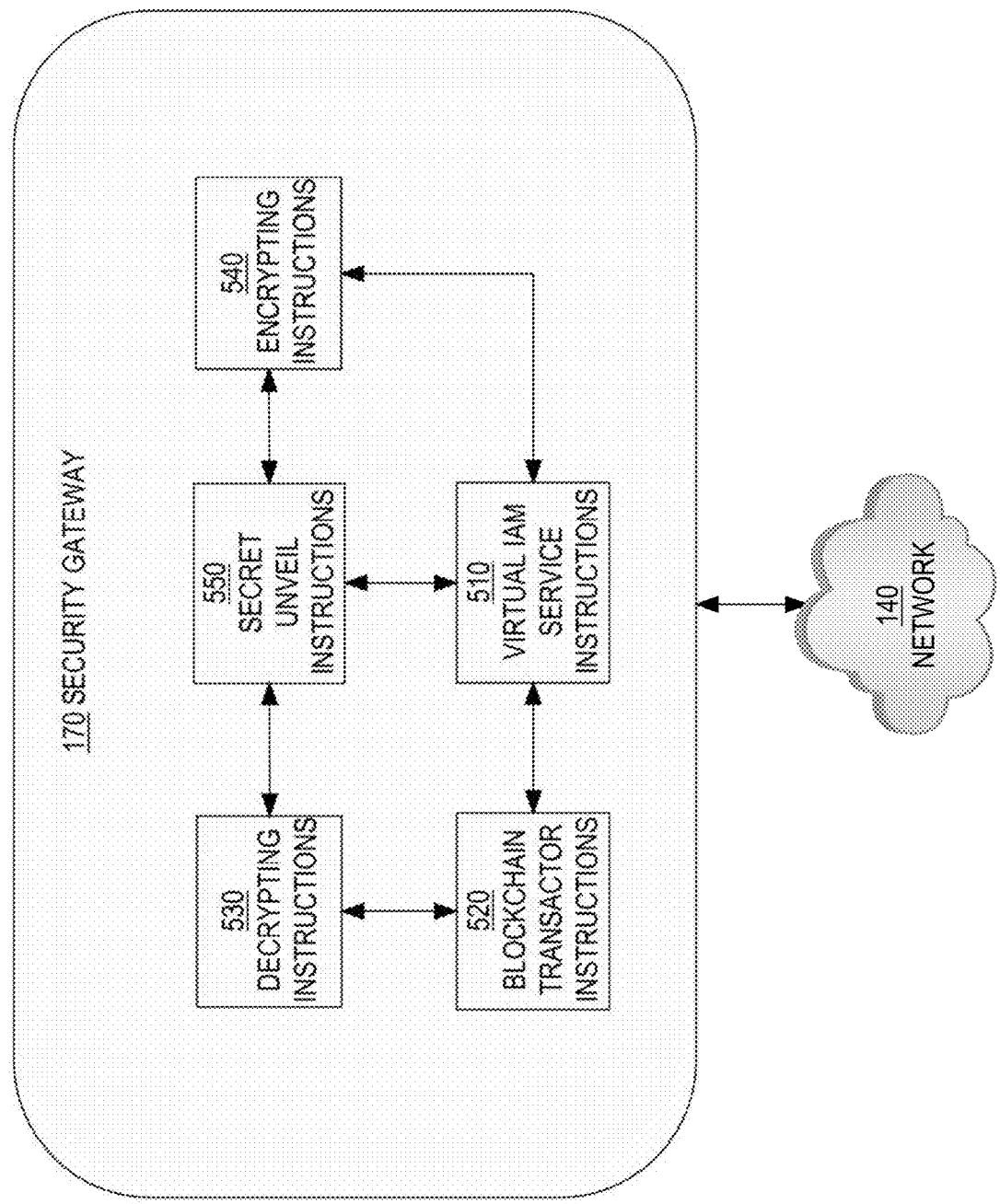
FIG. 5 illustrates a security gateway, in an example embodiment.

FIG. 5 illustrates a security gateway system. In an embodiment, a system 500 comprises a gateway 170 coupled to a data network 140. Security gateway 170 may be a computer, software and/or hardware or a combination storing instructions and/or databases that access, encrypt, decrypt, and utilize identity information for authentication services. Specifically, the security gateway 170 may connect to the blockchain 150 through the network 140 and work in conjunction with other security gateways 170 to access the encrypted shares stored as data in the blockchain 150 and perform authentication services.

The security gateway 170 may comprise programmed instructions that implement an Application Program Interface (API) that defines program functions that a client device 161 may call to connect to the security gateway 170. The API may be, for example, a representational state transfer (REST) API integrated with an HTTP server so that RESTful API calls can be issued in parameterized URLs over HTTP, Constrained Application Protocol (CoAP), or any other protocol from the client device 161 to the API.

In one embodiment, a client device 161 connected to the security gateway 170 through the API may be validated using the virtual IAM service instructions 510. The virtual IAM service instructions 510 may perform virtual IAM services for connected client device 161 using the identity information that is encrypted and stored as data in blockchain 150 by working in conjunction with other security gateways 170 to decrypt and reveal the identity information, as further described herein.

A requesting security gateway 170 may utilize virtual IAM service instructions 510 to perform authentication services on behalf of the enterprise servers that would otherwise be performing IAM 120 services. To authenticate, the virtual IAM service instructions 510 may receive security service information input in cleartext from a client device 161 outside the security gateway 170 or from applications inside the requesting security gateway 170, in an embodiment. The cleartext input may be unencrypted identity information, such as a username and password. In other embodiments, the security service information may be keys, tokens, certificates, audit logs, or any other security service data.

In response, the blockchain transactor 520 may request the encrypted share that corresponds to the public and private keys of the requesting security gateway 170, 150 from the blockchain 150. The requesting security gateway 170 may use decrypting instructions 530 to decrypt the encrypted share using the private key corresponding to the requesting security gateway 170. The security gateway 170 may also use secret unveil instructions 550 to send a participation request to any other available security gateways 170 to unveil or reveal the security service information. The participation of at least one other gateway would be sufficient to reveal the security service information. Availability of the other gateways 170 may be determined by which other gateways have internet access, in an example embodiment.

Once at least one available gateway 170 receives a participation request from a requesting security gateway 170 and confirms its availability using the secret unveil instructions 550, the available gateway(s) 170 may execute their blockchain transactor instructions 520 to access their respective encrypted shares stored as data in the blockchain 150, use decrypting instructions 530 to decrypt their respective shares using their respective private keys, use encrypting instructions 540 to re-encrypt the shares using the public key of the requesting security gateway 170, and use secret unveil instructions 550 to send the re-encrypted shares to the requesting security gateway 170 in order to reveal the security service information.

Figure 6:
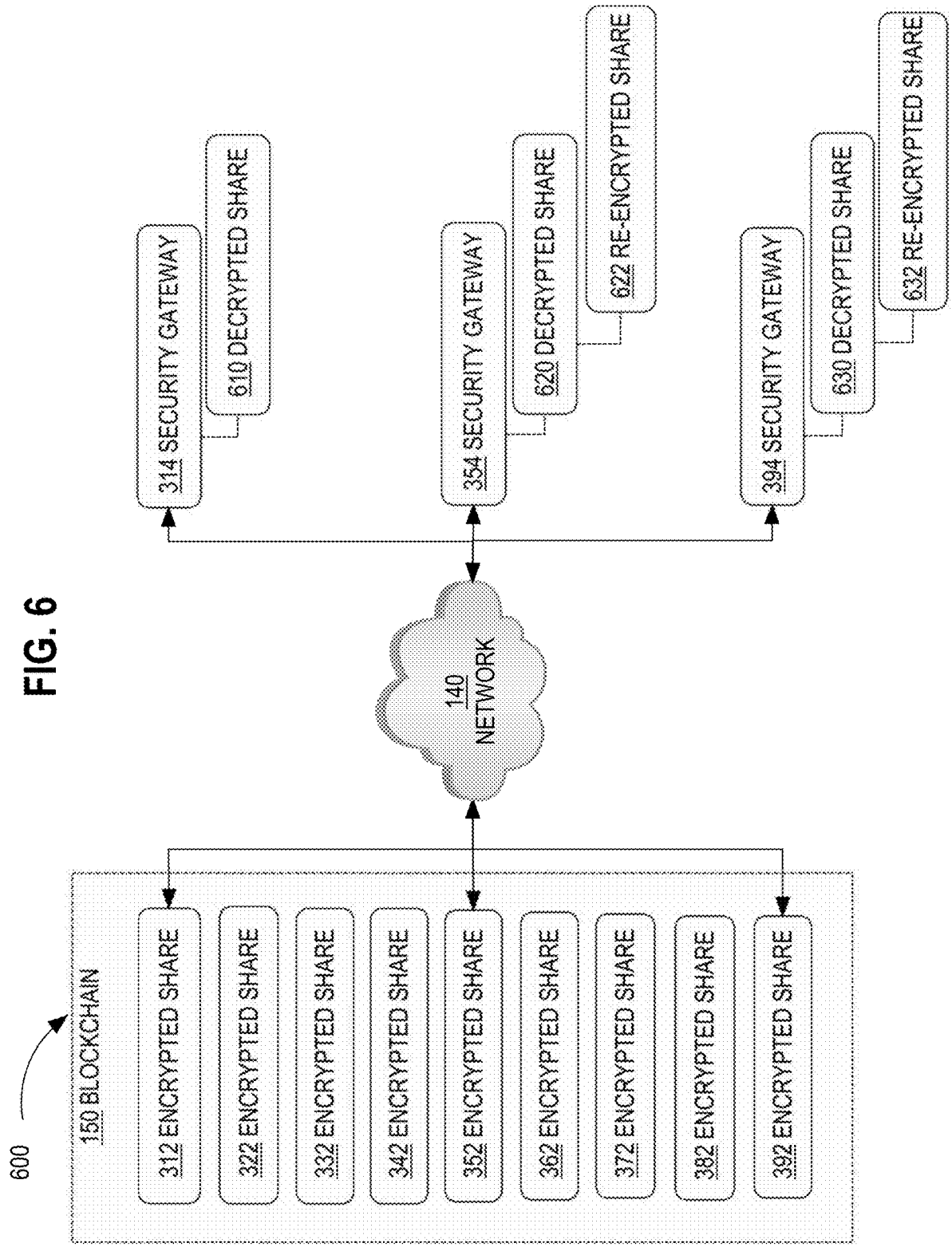
FIG. 6 illustrates a security gateway data decryption and integration workflow, in an example embodiment.

For example, FIG. 6 illustrates a security gateway data decryption and integration workflow 600. Each encrypted share 312, 322, 332, 342, 352, 362, 372, 382, 392 may be decrypted using each private key of the corresponding security gateways 314, 324, 334, 344, 354, 364, 374, 384, 394. For example, encrypted share 312 may be decrypted using a private key corresponding to security gateway 314, encrypted share 322 may be decrypted using a private key corresponding to security gateway 324, and so forth. In the example of FIG. 6, security gateway 314 may be a requesting security gateway that retrieves a corresponding encrypted share 312 that was encrypted using the public key associated with security gateway 314 from the blockchain 150. Requesting security gateway 314 may then decrypt the encrypted share 312 using the private key associated with the security gateway 314 to generate decrypted share 610.

In an embodiment, requesting security gateway 314 may also use secret unveil instructions 550 to send a participation request to other security gateways to reveal the security service information. The participation request may check the availability of other security gateways, which may be determined by access to the Internet, for example. Since two shares would be sufficient to reveal the identity information, at least one available gateway may participate in decrypting shares with the requesting gateway to generate a total of two decrypted shares.

In the example of FIG. 6, two available security gateways, such as available security gateways 354, 394, may subsequently respond by accessing their respective encrypted shares 352, 392 from the blockchain 150 using blockchain transactor instructions 520 and executing decrypting instructions 530 to decrypt their encrypted shares 352, 392 using their respective private keys and generate decrypted shares 620, 630. In an embodiment, available security gateways 354, 394 may then execute encrypting instructions 540 to re-encrypt their respective decrypted shares 620, 630 using the public key that corresponds to requesting security gateway 314 and generate re-encrypted shares 622, 632. Available security gateways 354, 394 may send the re-encrypted shares 622, 632 to the requesting security gateway 314 which may execute decrypting instructions 530 to decrypt the re-encrypted shares 622, 632 using the private key that is associated with the requesting security gateway 314. The requesting security gateway 314 may then execute secret unveiling instructions 550 to reveal the security service information.

Specifically, secret unveiling instructions 550 may reconstruct the stored digital representation of the polynomial function using the three x-y coordinate points from the three shares. By reconstructing the digital representation of the polynomial function, the data that is used as an integer in the polynomial function may be revealed. Subsequently, the data may be used by the virtual IAM service instructions 510 to authenticate a client device 161 connected to the requesting security gateway 314. An authenticated client device 161 may then access one or more other devices, such industrial equipment and other IoT devices.

In an embodiment, in addition to checking for the availability of other gateways, access policies may govern the secret unveil instructions 550 to monitor the status of any requesting security gateways 170. Any security gateways 170 that exhibit unusual requesting behavior may be automatically flagged and designated as compromised. In addition to the requesting security gateway 170 checking for the availability of other available gateways 170 for participation, other security gateways 170 may also conduct security checks for unusual behavior of the requesting security gateway 170 and/or the device requesting authentication access to ensure that the requesting security gateway 170 and or device has not been compromised by a bot or any other type of malware. Specifically, in an embodiment, device fingerprinting, integrity checks, role-based access control, geo-fencing, and any other security measures may be used to monitor and track users, devices, and/or security gateways 170 for security purposes. In an embodiment, each security gateways 170 may be programmed to record, for example, a timestamp, an actor, an operation/transaction, a severity, and a status of any activities processed by the security gateway 170 and generate an audit log for tracking and security purposes.

For example, if requesting security gateway 314 is compromised by a malicious bot that appropriates the security gateway 314 and sends repeated participation requests to any available security gateways 355, 394, each request may be logged by the available security gateways 355, 394. If too many requests are received, then an alert may be generated to indicate that security gateway 314 may be compromised. The threshold for generating an alert may be customizable depending on industry needs. In an embodiment, an alert may cause the available security gateways 355, 394 to stop accepting requests from security gateway 314.

4.0 Procedural Overview

Figure 7A:
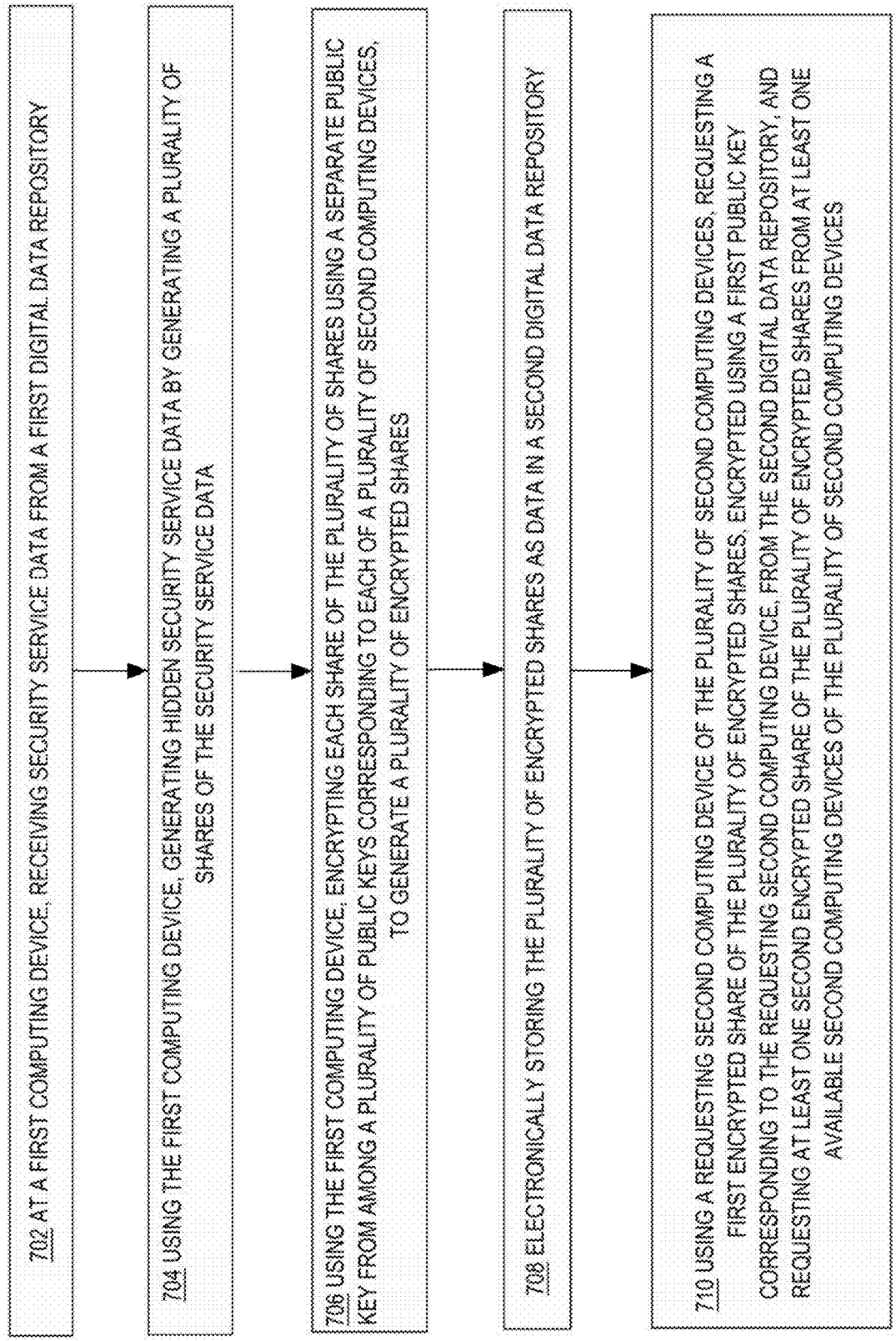
FIG. 7A illustrates a method or algorithm for improving data security through a distributed architecture, in an example embodiment.

FIG. 7A and FIG. 7B illustrate a method or algorithm for improving data security through a distributed architecture.

In one embodiment, a method 700 starts at step 702, at which security service data is received at a first computing device from a first digital data repository. The security service data may be, for example, usernames and passwords, keys, tokens, certificates, audit logs, or any other type of security service data. The first computing device may be security broker 130 while the first digital data repository may be a data repository 122 associated with an enterprise server that is configured to provide IAM 120 services. This method or algorithm 700 has the technological benefit of shifting the IAM 120 burden away from enterprise servers and distributing the burden across security broker 130, security gateway 170, and distributed blockchain 150 to increase tamper-resistance, confidentiality, and overall security. Therefore, each step of the method or algorithm 700 may be conducted on behalf of the enterprise server to provide IAM 120 services.

At step 704, the security broker 130 generates hidden security service data by generating a plurality of shares of the security service data. Specifically, security broker 130 may use secret sharing instructions 230 to generate a stored digital representation of a polynomial function. The secret sharing instructions 230 may calculate a plurality of x-y coordinate points from the polynomial function to generate a plurality of shares of the security service data. Each share represents one x-y coordinate point and any number of shares may be generated. The total number of shares may match the total number of security gateways 170. In the example embodiment of FIG. 3, a total of nine points or shares may be generated to correspond to each of nine security gateways 170.

At step 706, the security broker 130 encrypts each share of the plurality of shares using a separate public key from among a plurality of public keys corresponding to each of a plurality of second computing devices, to generate a plurality of encrypted shares. The public keys may be public keys corresponding to one of nine security gateways 170. As with the example of FIG. 3, the security broker 130 may use encrypting instructions 240 to encrypt each of the nine shares and generate nine encrypted shares. Individual public keys corresponding to each of the nine security gateways 170 may be used for the encryption such that the private keys of each gateway may decrypt a corresponding share of the nine shares. The distributed design of secret sharing improves data security by ensuring that any single security gateway 170 cannot access sensitive security service data alone. Therefore, any single security gateway 170 that is compromised by malware does not reveal sensitive information.

At step 708, once the security broker 130 has generated the encrypted shares, all the encrypted shares may be stored electronically as data in a second digital data repository, such as the distributed digital blockchain 150. Since each block of a distributed blockchain 150 contains a hash of the previous block before it, any unauthorized changes to data within the blockchain produces changes in the hash of each block in the chain. Therefore, unauthorized changes can easily be detected through the use of blockchains 150. Moreover, all changes to security service information are first approved by a consensus network of computers 155, which protects the integrity of the blockchain data.

Of the total number of gateways, two is the subset that is sufficient to reveal the hidden security service data. Therefore, at step 710, a subset of two security gateways 170 may decrypt their corresponding encrypted shares using their respective private keys to generate at least two decrypted shares. Specifically, a requesting security gateway 170 may receive an authentication request from a client device 161 to access one or more IoT computing device. In order to authenticate the client device 161, the requesting security gateway 170 may request its corresponding encrypted share from the blockchain 150. This corresponding encrypted share may be decrypted using the requesting security gateway's private key at step 716. The requesting security gateway 170 may also request the participation of at least one other available security gateway 170.

The method 700 continues at step 712 of FIG. 7B, where the available security gateway may access its corresponding encrypted share from the blockchain and decrypt it using its private keys to generated a decrypted share.

At step 714, in an embodiment, the available security gateway 170 may then re-encrypt its decrypted share using the public key corresponding to the requesting security gateway 170 to generate a re-encrypted share. The re-encrypted share may then be sent to the requesting security gateway 170 for decryption using the private key of the requesting security gateway.

At step 716, the requesting security gateway 170 may receive the re-encrypted share from the available security gateway 170, as well as the requesting security gateway's corresponding encrypted share from the blockchain 150, and decrypt the shares using the requesting security gateway's private key. Decrypting the shares may form the two x-y coordinate points, which may then be used to reconstruct the stored digital representation of the polynomial function.

At step 718, a readable copy of the hidden security service data may be formed and stored by reconstructing the digital representation of the polynomial function. The numerical integer $a_0$ representing the security service information, or security service data, may then be obtained from the digital representation of the polynomial function. In an embodiment, the numeric value for $a_0$ may be converted back into readable security service data if a cipher was previously used to convert the security service data into a numeric value.

Subsequently, at step 720, the requesting security gateway 170 may use the security service data to authenticate a client device 161 and grant or deny access to the one or more IoT computing devices.

Using the foregoing techniques, programmed computers may use a distributed system to hide, transfer, store, and utilize sensitive data in a manner that maximizes data security and data integrity while improving data delivery and authentication techniques. Implementations provide for decreased use of network bandwidth and decreased use of processing resources for enterprise servers that no longer provide direct IAM 120 services to numerous users, applications, and/or devices. In other words, by decentralizing the IAM 120 services, network traffic is no longer concentrated at the enterprise server, which results in less network traffic and use of server processing resources.

Furthermore, the approaches disclosed herein improve data security and data integrity. The use of a blockchain 150 ensures that all changes to security service information are first approved by the consensus network, which protects the integrity of the blockchain data. The nature of the blockchain 150 also ensures that each new block of data is linked to the previous block, creating an improved method of documenting changes and rejecting unapproved changes. Consequently, the blockchain 150 functions as a secure backup for sensitive security service information with high Practical Byzantine Fault Tolerance (PBFT) and other types of consensus algorithms.

Improved data security is also provided by the techniques described herein through the various encryption methods. The use of secret sharing encryption ensures that the security service information is protected by splitting the security service information into shares and encrypting those shares with public keys corresponding to different gateways. For a malicious attack to successfully obtain the security service information, the private keys of at least three gateways 170 would be needed. Since it is less likely a malicious attack could obtain the private keys of three separate gateways 170, the secret sharing encryption improves the security of the data.

4.0 Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, meters, sensors, and any other electronic device that incorporates hard-wired and/or program logic to implement the described techniques, one or more virtual computing machines or instances in a data center, and/or a network of server computers and/or personal computers.

Figure 8:
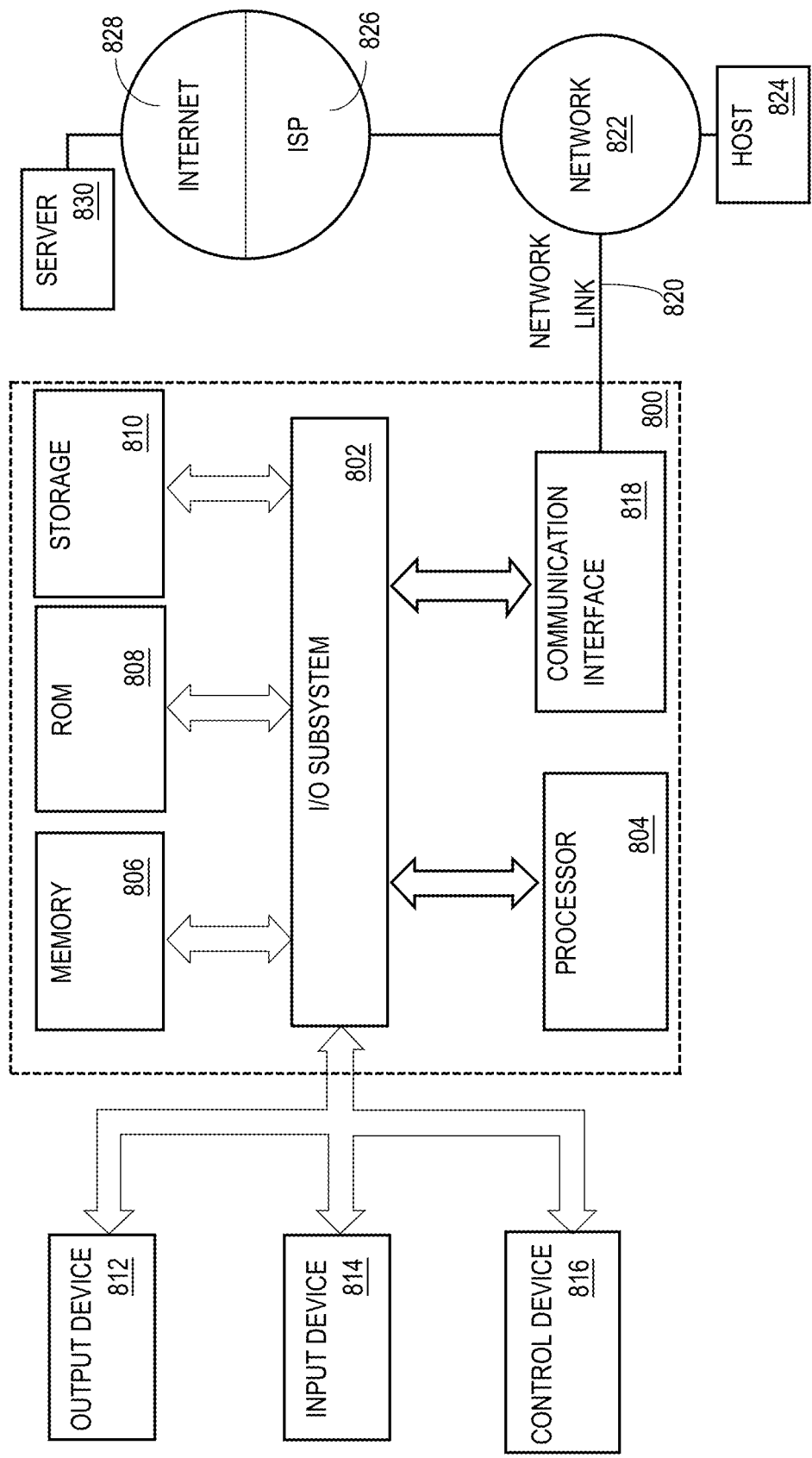
FIG. 8 illustrates a computer system upon which an embodiment of the invention may be implemented.

FIG. 8 is a block diagram that illustrates an example computer system with which an embodiment may be implemented. In the example of FIG. 8, a computer system 800 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 800 includes an input/output (I/O) subsystem 802 which may include a bus and/or other communication mechanism(s) for communicating information and/or instructions between the components of the computer system 800 over electronic signal paths. The I/O subsystem 802 may include an I/O controller, a memory controller and at least one I/O port. The electronic signal paths are represented schematically in the drawings, for example as lines, unidirectional arrows, or bidirectional arrows.

At least one hardware processor 804 is coupled to I/O subsystem 802 for processing information and instructions. Hardware processor 804 may include, for example, a general-purpose microprocessor or microcontroller and/or a special-purpose microprocessor such as an embedded system or a graphics processing unit (GPU) or a digital signal processor or ARM processor. Processor 804 may comprise an integrated arithmetic logic unit (ALU) or may be coupled to a separate ALU.

Computer system 800 includes one or more units of memory 806, such as a main memory, which is coupled to I/O subsystem 802 for electronically digitally storing data and instructions to be executed by processor 804. Memory 806 may include volatile memory such as various forms of random-access memory (RAM) or other dynamic storage device. Memory 806 also may be used for storing temporary variables or other intermediate information during execution of instructions to be executed by processor 804. Such instructions, when stored in non-transitory computer-readable storage media accessible to processor 804, can render computer system 800 into a special-purpose machine that is customized to perform the operations specified in the instructions.

Computer system 800 further includes non-volatile memory such as read only memory (ROM) 808 or other static storage device coupled to I/O subsystem 802 for storing information and instructions for processor 804. The ROM 808 may include various forms of programmable ROM (PROM) such as erasable PROM (EPROM) or electrically erasable PROM (EEPROM). A unit of persistent storage 810 may include various forms of non-volatile RAM (NVRAM), such as FLASH memory, or solid-state storage, magnetic disk or optical disk such as CD-ROM or DVD-ROM, and may be coupled to I/O subsystem 802 for storing information and instructions. Storage 810 is an example of a non-transitory computer-readable medium that may be used to store instructions and data which when executed by the processor 804 cause performing computer-implemented methods to execute the techniques herein.

The instructions in memory 806, ROM 808 or storage 810 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL), no SQL, an object store, a graph database, a flat file system or other data storage.

Computer system 800 may be coupled via I/O subsystem 802 to at least one output device 812. In one embodiment, output device 812 is a digital computer display. Examples of a display that may be used in various embodiments include a touch screen display or a light-emitting diode (LED) display or a liquid crystal display (LCD) or an e-paper display. Computer system 800 may include other type(s) of output devices 812, alternatively or in addition to a display device. Examples of other output devices 812 include printers, ticket printers, plotters, projectors, sound cards or video cards, speakers, buzzers or piezoelectric devices or other audible devices, lamps or LED or LCD indicators, haptic devices, actuators or servos.

At least one input device 814 is coupled to I/O subsystem 802 for communicating signals, data, command selections or gestures to processor 804. Examples of input devices 814 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 816, which may perform cursor control or other automated control functions such as navigation in a graphical interface on a display screen, alternatively or in addition to input functions. Control device 816 may be a touchpad, a mouse, a trackball, or cursor direction keys for communicating direction information and command selections to processor 804 and for controlling cursor movement on display 812. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 814 may include a combination of multiple different input devices, such as a video camera and a depth sensor.

In another embodiment, computer system 800 may comprise an internet of things (IoT) device in which one or more of the output device 812, input device 814, and control device 816 are omitted. Or, in such an embodiment, the input device 814 may comprise one or more cameras, motion detectors, thermometers, microphones, seismic detectors, other sensors or detectors, measurement devices or encoders and the output device 812 may comprise a special-purpose display such as a single-line LED or LCD display, one or more indicators, a display panel, a meter, a valve, a solenoid, an actuator or a servo.

When computer system 800 is a mobile computing device, input device 814 may comprise a global positioning system (GPS) receiver coupled to a GPS module that is capable of triangulating to a plurality of GPS satellites, determining and generating geo-location or position data such as latitude-longitude values for a geophysical location of the computer system 800. Output device 812 may include hardware, software, firmware and interfaces for generating position reporting packets, notifications, pulse or heartbeat signals, or other recurring data transmissions that specify a position of the computer system 800, alone or in combination with other application-specific data, directed toward host 824 or server 830.

Computer system 800 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 800 in response to processor 804 executing at least one sequence of at least one instruction contained in main memory 806. Such instructions may be read into main memory 806 from another storage medium, such as storage 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 810. Volatile media includes dynamic memory, such as memory 806. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 802. Transmission media can also take the form of acoustic or light waves, such as those generated during radio-wave and infra-red data communications.

Various forms of media may be involved in carrying at least one sequence of at least one instruction to processor 804 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 800 can receive the data on the communication link and convert the data to a format that can be read by computer system 800. For instance, a receiver such as a radio frequency antenna or an infrared detector can receive the data carried in a wireless or optical signal and appropriate circuitry can provide the data to I/O subsystem 802 such as place the data on a bus. I/O subsystem 802 carries the data to memory 806, from which processor 804 retrieves and executes the instructions. The instructions received by memory 806 may optionally be stored on storage 810 either before or after execution by processor 804.

Computer system 800 also includes a communication interface 818 coupled to bus 802. Communication interface 818 provides a two-way data communication coupling to network link(s) 820 that are directly or indirectly connected to at least one communication networks, such as a network 822 or a public or private cloud on the Internet. For example, communication interface 818 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 822 broadly represents a local area network (LAN), wide-area network (WAN), campus network, internetwork or any combination thereof. Communication interface 818 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 818 sends and receives electrical, electromagnetic or optical signals over signal paths that carry digital data streams representing various types of information.

Network link 820 typically provides electrical, electromagnetic, or optical data communication directly or through at least one network to other data devices, using, for example, satellite, cellular, Wi-Fi, or BLUETOOTH technology. For example, network link 820 may provide a connection through a network 822 to a host computer 824.

Furthermore, network link 820 may provide a connection through network 822 or to other computing devices via internetworking devices and/or computers that are operated by an Internet Service Provider (ISP) 826. ISP 826 provides data communication services through a world-wide packet data communication network represented as internet 828. A server computer 830 may be coupled to internet 828. Server 830 broadly represents any computer, data center, virtual machine or virtual computing instance with or without a hypervisor, or computer executing a containerized program system such as DOCKER or KUBERNETES. Server 830 may represent an electronic digital service that is implemented using more than one computer or instance and that is accessed and used by transmitting web services requests, uniform resource locator (URL) strings with parameters in HTTP payloads, API calls, app services calls, or other service calls. Computer system 800 and server 830 may form elements of a distributed computing system that includes other computers, a processing cluster, server farm or other organization of computers that cooperate to perform tasks or execute applications or services. Server 830 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 830 may comprise a web application server that hosts a presentation layer, application layer and data storage layer such as a relational database system using structured query language (SQL) or no SQL, an object store, a graph database, a flat file system or other data storage.

Computer system 800 can send messages and receive data and instructions, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, and/or stored in storage 810, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 804. While each processor 804 or core of the processor executes a single task at a time, computer system 800 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A computer-implemented data security method, comprising:
    using a first computing device, generating a plurality of encrypted shares from a plurality of shares of hidden security service data by using a separate public key from a plurality of public keys that correspond to a plurality of second computing devices;
    using a requesting second computing device, accessing and decrypting a first encrypted share of the plurality of encrypted shares using a first private key corresponding to the requesting second computing device to generate a first portion of the hidden security service data;
    using an available second computing device, decrypting a second encrypted share of the plurality of encrypted shares using a second private key corresponding to the available second computing device to generate a decrypted share;
    using the available second computing device, re-encrypting the decrypted share using a public key corresponding to the requesting second computing device to generate a re-encrypted share and sending the re-encrypted share to the requesting second computing device;
    using the requesting second computing device, decrypting the re-encrypted share using the first private key to generate a second portion of the hidden security service data;
    using the first portion and second portion of the hidden security service data, forming and using a readable copy of the hidden security service data to perform authentications.

2. The method of claim 1, further comprising:
    in response to generating the plurality of encrypted shares, storing the plurality of encrypted shares in a distributed blockchain data repository;
    wherein accessing and decrypting the first encrypted share comprises accessing the first encrypted share from the distributed blockchain data repository.

3. The method of claim 1, further comprising:
    forming the hidden security service data by using security service data to generate a stored digital representation of a polynomial function and calculating a plurality of x-y coordinate points from the polynomial function;
    wherein each share of the plurality of encrypted shares represents a point of the plurality of x-y coordinate points.

4. The method of claim 1, wherein forming the readable copy of the hidden security comprises calculating a polynomial function.

5. The method of claim 1, further comprising:
    using the plurality of second computing devices, conducting security checks on the requesting second computing device.

6. The method of claim 1, further comprising:
    in response to receiving an availability request, checking an availability of the plurality of second computing devices to determine the available second computing device.

7. The method of claim 1, wherein the readable copy of the hidden security service data comprises one or more usernames and passwords, keys, certificates, or audit logs.

8. One or more non-transitory computer-readable storage media storing one or more sequences of program instructions which, when executed by one or more computing devices, cause:
    using a first computing device, generating a plurality of encrypted shares from a plurality of shares of hidden security service data by using a separate public key from a plurality of public keys that correspond to a plurality of second computing devices;
    using a requesting second computing device, accessing and decrypting a first encrypted share of the plurality of encrypted shares using a first private key corresponding to the requesting second computing device to generate a first portion of the hidden security service data;
    using an available second computing device, decrypting a second encrypted share of the plurality of encrypted shares using a second private key corresponding to the available second computing device to generate a decrypted share;
    using the available second computing device, re-encrypting the decrypted share using a public key corresponding to the requesting second computing device to generate a re-encrypted share and sending the re-encrypted share to the requesting second computing device;
    using the requesting second computing device, decrypting the re-encrypted share using the first private key to generate a second portion of the hidden security service data;
    using the first portion and second portion of the hidden security service data, forming and using a readable copy of the hidden security service data to perform authentications.

9. The one or more non-transitory machine-readable media of claim 8, further comprising instructions that, when executed by one or more computing devices, cause:
    in response to generating the plurality of encrypted shares, storing the plurality of encrypted shares in a distributed blockchain data repository;
    wherein accessing and decrypting the first encrypted share comprises accessing the first encrypted share from the distributed blockchain data repository.

10. The one or more non-transitory machine-readable media of claim 8, further comprising instructions that, when executed by one or more computing devices, cause:

forming the hidden security service data by using security service data to generate a stored digital representation of a polynomial function and calculating a plurality of x-y coordinate points from the polynomial function;

wherein each share of the plurality of encrypted shares represents a point of the plurality of x-y coordinate points.

11. The one or more non-transitory machine-readable media of claim 8, wherein forming the readable copy of the hidden security comprises calculating a polynomial function.

12. The one or more non-transitory machine-readable media of claim 8, further comprising instructions that, when executed by one or more computing devices, cause:

using the plurality of second computing devices, conducting security checks on the requesting second computing device.

13. The one or more non-transitory machine-readable media of claim 8, further comprising instructions that, when executed by one or more computing devices, cause:

in response to receiving an availability request, checking an availability of the plurality of second computing devices to determine the available second computing device.

14. The one or more non-transitory machine-readable media of claim 8, wherein the readable copy of the hidden security service data comprises one or more usernames and passwords, keys, certificates, or audit logs.

15. A computer system providing an improvement in data security, the system comprising:

a distributed blockchain data repository;

a first computing device that is communicatively coupled to the distributed blockchain data repository and comprising a first non-transitory data storage medium storing instructions which, when executed by the first computing device, cause:

generating a plurality of encrypted shares from a plurality of shares of hidden security service data by using a separate public key from a plurality of public keys that correspond to a plurality of second computing devices;

at least two second computing devices of the plurality of second computing devices that are communicatively coupled to the distributed blockchain data repository and each comprising a second non-transitory data storage medium, storing instructions which, when executed by the plurality of second computing devices, cause:

using a requesting second computing device, accessing and decrypting a first encrypted share of the plurality of encrypted shares using a first private key corresponding to the requesting second computing device to generate a first portion of the hidden security service data;

using an available second computing device, decrypting a second encrypted share of the plurality of encrypted shares using a second private key corresponding to the available second computing device to generate a decrypted share;

using the available second computing device, re-encrypting the decrypted share using a public key corresponding to the requesting second computing device to generate a re-encrypted share and sending the re-encrypted share to the requesting second computing device;

using the requesting second computing device, decrypting the re-encrypted share using the first private key to generate a second portion of the hidden security service data;

using the first portion and second portion of the hidden security service data, forming and using a readable copy of the hidden security service data to perform authentications.

16. The computer system of claim 15, comprising the second non-transitory data storage medium, storing additional instructions which, when executed by the plurality of second computing devices, cause:

in response to generating the plurality of encrypted shares, storing the plurality of encrypted shares in a distributed blockchain data repository;

wherein accessing and decrypting the first encrypted share comprises accessing the first encrypted share from the distributed blockchain data repository.

17. The computer system of claim 15, comprising the first non-transitory data storage medium, storing additional instructions which, when executed by the first computing device, cause:

forming the hidden security service data by using security service data to generate a stored digital representation of a polynomial function and calculating a plurality of x-y coordinate points from the polynomial function;

wherein each share of the plurality of encrypted shares represents a point of the plurality of x-y coordinate points.

18. The computer system of claim 15, wherein forming the readable copy of the hidden security comprises calculating a polynomial function.

19. The computer system of claim 15, comprising the second non-transitory data storage medium, storing additional instructions which, when executed by the plurality of second computing devices, cause:

conducting security checks on the requesting second computing device.

20. The computer system of claim 15, wherein the readable copy of the hidden security service data comprises one or more usernames and passwords, keys, certificates, or audit logs.

* * * * *